UNITED STATES PATENT OFFICE 2,676,948

CURING CATALYST FOR POLYSILOXANE RESINS

Robert D. Rowley, Pittsburgh, Pa., assignor to Westinghouse Electric Corporation, East Pittsburgh, Pa., a corporation of Pennsylvania No Drawing. Application October 21, 1952, Serial No. 316,083

6 Claims. (Cl. 260—46.5)

This invention relates to heat-hardenable organopolysiloxane resins embodying a novel curing catalyst.

In the practice of molding or bonding laminar materials with a heat-hardenable organopolysiloxane resin (to be hereinafter referred to as "silicone" resin), a serious handicap has been the unduly long-cure time cycles required to cross-link or thermoset the silicone resin. With the conventional catalysts, such as a metallic drier or an organic base, heretofore commonly utilized in curing silicone resins, a cure time in a hot press of at least one hour was required for molding or laminating articles having a thickness of one inch. Even after such an extended period of time, as compared with three to ten minutes cure time for conventional phenolic, urea, or melamine resins, the silicone resin advanced no further than to a solid thermoplastic stage.

A silicone resin in the above thermoplastic stage has little or no hot strength, that is, the molded or laminated article will not retain its shape while hot. Thus, the molded or laminated silicone had to be cooled before removing from a mold or press. It was then necessary to subject the article to a prolonged after-bake to obtain a thermoset plastic with desired hot-strength properties.

A still further difficulty was encountered during the afterbaking period. Because of the lack of hot strength in the molded or laminated article before it was finally cured to the thermoset stage, it was necessary to provide special forms to hold the article to dimensions, during the preliminary stage of the afterbake. Otherwise, considerable warpage would occur due to the thermoplastic nature of the partially cured silicone resin.

An object of this invention is to provide for use in curing silicone resins a novel, quick-curing catalyst comprising a mixture of guanidine carbonate, a metal salt of an organic acid, and acetic anhydride.

A further object of the invention is to provide a resinous composition comprising a heat-hardenable silicone resin and a novel curing catalyst comprising a mixture of guanidine carbonate, a metal salt of an organic acid and acetic anhydride.

Other objects of the invention will, in part, be obvious and will, in part, appear hereinafter.

I have discovered that by admixing with a heat-hardenable silicone resin containing more than 1.0 and less than 2.0 organic radicals per silicon atom, and preferably from 1.1 to 1.9 radicals per silicon atom, a novel curing catalyst comprising a mixture of guanidine carbonate, a metal salt of an organic acid soluble in said resin, and acetic anhydride, the cure time of the resin is reduced and an article molded or laminated with the resin has sufficient hot strength to permit its removal from a hot mold or press. An article molded or laminated in accordance with my invention does not require an after-baking period, but in some circumstances some heating may be deemed desirable. In the latter circumstances, the afterbake time is substantially reduced.

The formulation of my novel catalyst may be varied from 6 to 12 parts by weight of guanidine carbonate, from 6 to 12 parts by weight of the metal salt, and from 2 to 6 parts by weight of acetic anhydride. The amount of formulated catalyst used may be varied from 0.1% to 1.2% by weight of the silicone resin.

It is to be understood that the reaction product of guanidine carbonate, or a suitable guanidine salt, with acetic anhydride, or a suitable acid anhydride may (1) be prepared beforehand and then admixed with the metal salt of an organic acid, (2) the three constituents making up my novel catalyst may be admixed at one time, or (3) the three constituents added individually to the resin to be catalyzed.

In the reaction of a guanidine salt with an acid anhydride, the reaction product derived from the reaction depends upon the amount of acid anhydride added. For example, when guanidine carbonate is treated with a slight excess of acetic anhydride, the mono-acyl derivative may be isolated.

$$(H_2N\overset{\overset{NH}{\|}}{C}NH_2)_2 \cdot H_2CO_3 + 2(CH_3CO)_2 \longrightarrow$$

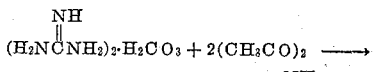

In the presence of two mols of acetic anhydride, the diacyl derivative is obtained; and if still larger excesses of acetic anhydride are used, the diacyl product is dehydrated; the reactions are illustrated by the following equations:

$$(H_2N\overset{\overset{NH}{\|}}{C}NH_2)_2 \cdot H_2CO_3 + 4(CH_3CO)_2O \longrightarrow$$

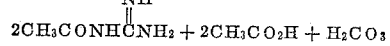

$$CH_3CONH\overset{\overset{NH}{\|}}{C}NHCOCH_3 + (CH_3CO)_2O \longrightarrow$$

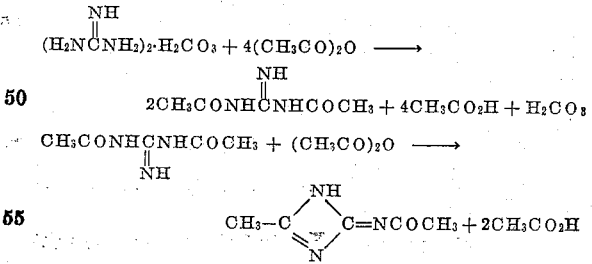

An exemplary heat-hardenable silicone resin containing more than 1.0 and less than 2.0 organic radicals per silicon atom to which the catalyst of this invention is applicable is a resin containing 15 to 50 mol per cent of methyl siloxane units, from 25 to 55 mol per cent of phenyl siloxane units, and 30 to 50 mol per cent of methyl phenyl siloxane units in which siloxane the silicon atoms are linked together by a lattice of alternate oxygen and silicon atoms.

The silicone resin is prepared by hydrolyzing and co-condensing a mixture of a methyl silane, a phenyl silane and a methyl phenyl silane, in which the remaining valences of the silicon atoms are satisfied by readily hydrolyzable radicals or atoms. While a major portion of the oxygen atoms of the silicone resin are each linked to two silicon atoms, a portion of the oxygen atoms are present as residual hydroxyl, alkoxy or like radicals and are active centers for further polymerization.

It is to be understood that the catalyst of my invention is broadly applicable to any soluble polysiloxane resin having hydrocarbon radicals attached to silicon selected from the group consisting of alkyl (e. g. methyl, ethyl, propyl, etc.), aryl (phenyl), alkaryl (tolyl), and aralkyl (benzyl) radicals. Examples are a methyl polysiloxane having 1.4 methyl groups per silicone atom and a phenyl polysiloxane having 1.2 phenyl groups per silicon atom. Such resins may also contain two or more different radicals attached to silicon as is the case with the methyl phenyl resins described herein. All of these resins may be dissolved in any of the well-known solvents such as benzene, toluene, xylene, naphtha, petroleum spirits, etc.

The metal salt of the organic acid may be selected from the soluble salts of any number of metals such as lead, tin, magnesium, cobalt, calcium, and iron to mention a few. Examples of suitable acid radicals are those yielding the naphthenate, resinate, linoleate, stearate, oleate, octoate salts, or even the lower acid radicals such as those yielding the acetate, butyrate, etc., salts.

The guanidine carbonate and acetic anhydride are admixed in the catalyst formulation as received from commercial sources.

In molding or laminating practice, it is customary to provide the resin with a suitable filler, the kind of filler used depending upon the type of service in which the article being produced is to be subjected. Among the conventional fillers known in the art are glass mat, glass fibers, glass cloth, asbestos fibers and cloth, silica, mica, and similar inorganic materials.

EXAMPLE I

The following is an example of a resinous molding composition prepared with the curing catalyst of this invention:

8.7 grams of guanidine carbonate
8.7 grams of lead naphthenate
4.0 grams of acetic anhydride
1740 grams of glass fibers
2900 grams of resin comprising:

45 mol per cent of methyl phenyl siloxane structural units
25 mol per cent of phenyl siloxane structural units
30 mol per cent of methyl siloxane structural units

EXAMPLE II

The following is an example of the same resinous molding composition of Example I but prepared using a conventional curing catalyst:

87 cc. of a 10% solution of triethanolamine in alcohol
1740 grams of glass fibers
2900 grams of the resin of Example I The compositions of Examples I and II were molded under identical conditions using a molding temperature of 160° C. and a cure time of 30 minutes for ½ inch thick pieces. The composition of Example I cured to such an extent that the hot strength was sufficient to allow the molded pieces to be removed satisfactorily from the hot mold. It was necessary to cool the mold containing the composition of Example II before it could be safely removed.

Table I

The following table is a comparison of the physical properties of the molded compositions of Examples I and II:

| | Example I | Example II |
|---|---|---|
| Flexural strength flatwise with the grain at 150° ............................... p. s. i. | 2,500 | 490 |
| Flexural strength edgewise with the grain at 150° C ................................ p. s. i. | 3,070 | 570 |
| Temperature at which there was distortion of the sample ............................ ° C | 240 to 250 | 95 to 118 |

The catalyzed resins of Examples I and II in the solvent-free state, both had a shelf life in excess of three months at room temperature.

As evidenced by the comparative hot strengths shown in Table I above, the resin of Example I, catalyzed with the formulation of guanidine carbonate, the metal salt, and acetic anhydride of my invention, cured to a more advanced stage than the resin of Example II cured with a conventional catalyst over the same period of time.

Since certain changes may be made in the above description and different modes of applying the principle of the invention may be made without departing from the spirit and scope thereof, it is intended that all the matter contained in the above description shall be interpreted as illustrative and not in a limiting sense.

I claim as my invention:

1. A composition of matter comprising a heat-hardenable organopolysiloxane resin containing an average of more than 1 and less than 2 organic groups per silicon atom, the organic groups being attached to the silicon atoms of the organopolysiloxane by carbon-silicon linkages, and a curing catalyst for said resin comprising from 0.1% to 1.2% by weight of a mixture of from 6 to 12 parts by weight of guanidine carbonate, 6 to 12 parts by weight of a metal salt of an organic carboxylic acid soluble in said resin and 2 to 6 parts by weight of acetic anhydride.

2. The composition of matter of claim 1 in which the metal salt of the organic carboxylic acid is lead naphthenate.

3. The composition of matter of claim 1 in which the metal of the metal salt of an organic carboxylic acid is selected from the group consisting of calcium, cobalt, manganese, zinc, tin, lead, and iron.

4. The method which comprises admixing from 0.1% to 1.2% by weight of a curing catalyst comprising a mixture of guanidine carbonate, acetic anhydride, and a metal salt of an organic carboxylic acid in a resinous organopolysiloxane having hydrocarbon groups attached to silicon atoms in which the ratio of hydrocarbon groups to silicon atoms is from 1.1 to 1.9, the hydrocarbon groups in the organopolysiloxane being attached to the silicon atoms thereof by carbon-silicon linkages, and thereafter heating the mixture until the organopolysiloxane cures to a substantially infusible and insoluble state.

5. A cured resinous article of manufacture comprising the product derived by molding a composition of matter comprising (1) a heat-hardenable organopolysiloxane resin containing an average of 1.1 to 1.9 organic groups per silicon atom, the organic groups being attached to the silicon atoms of the organopolysiloxane by carbon-silicon linkages and (2) a curing catalyst for said resin comprising a mixture of from 0.1% to 1.2% by weight of a mixture of from 6 to 12 parts by weight of guanidine carbonate, 6 to 12 parts by weight of a metal salt of an organic carboxylic acid and 2 to 6 parts by weight of acetic anhydride, and (3) an inorganic filler.

6. The article of claim 5 in which the metal salt of the organic carboxylic acid is lead naphthenate.

References Cited in the file of this patent

UNITED STATES PATENTS

| Number | Name | Date |
|---|---|---|
| 2,449,572 | Welsh | Sept. 21, 1948 |
| 2,459,387 | McGregor et al. | Jan. 18, 1949 |
| 2,596,085 | Wormuth | May 6, 1952 |